(12) United States Patent
Belloni et al.

(10) Patent No.: US 10,522,303 B2
(45) Date of Patent: Dec. 31, 2019

(54) CONTACT ASSEMBLY FOR ELECTRICALLY AND MECHANICALLY CONNECTING A FIRST TERMINAL OF A FIRST APPARATUS TO A SECOND TERMINAL OF A SECOND APPARATUS

(71) Applicant: ABB Schweiz AG, Baden (CH)

(72) Inventors: Francesco Belloni, Bergamo (IT); Andrea Farina, Monza (IT)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 16/149,228

(22) Filed: Oct. 2, 2018

(65) Prior Publication Data

US 2019/0035564 A1   Jan. 31, 2019

Related U.S. Application Data

(63) Continuation of application No. PCT/EP2017/055748, filed on Mar. 10, 2017.

(30) Foreign Application Priority Data

Apr. 11, 2016   (EP) .................................... 16164714

(51) Int. Cl.
*H01H 1/58* (2006.01)
*H01H 1/38* (2006.01)
(Continued)

(52) U.S. Cl.
CPC ............ *H01H 1/5866* (2013.01); *H01H 1/38* (2013.01); *H01H 33/025* (2013.01);
(Continued)

(58) Field of Classification Search
CPC .. H01R 13/6315; H01R 13/18; H01R 13/111; H01R 13/187; H01H 1/5866; H01H 1/38; H02B 11/04
(Continued)

(56) References Cited

U.S. PATENT DOCUMENTS

2009/0258527 A1* 10/2009 Naratanan ................ H01H 1/42
                                                              439/357
2018/0248290 A1   8/2018 Wollitzer et al.

FOREIGN PATENT DOCUMENTS

CN    101483115 A    7/2009
DE    4105335 A1    8/1992
(Continued)

OTHER PUBLICATIONS

European Patent Office, International Search Report & Written Opinion issued in corresponding Application No. PCT/EP2017/055748, dated May 11, 2017, 15 pp.
(Continued)

*Primary Examiner* — Gary F Paumen
(74) *Attorney, Agent, or Firm* — Taft Stettinius & Hollister LLP; J. Bruce Schelkopf

(57) ABSTRACT

A contact assembly for connecting electrically and mechanically a first terminal of a first apparatus to a second terminal of a second apparatus, wherein at least one of the first and the second apparatus is movable with respect to the other along a connection/disconnection direction, includes: a plurality of electrically conducting contact-finger-elements, each including a main contact portion configured for engaging the second terminal and an auxiliary contact portion for engaging the first terminal, wherein the finger-contact-elements are supported by a support frame of the contact assembly connectable to the first terminal or are configured for being directly connectable and supportable by the first terminal; one or more spring elements configured for acting on the contact-finger-elements so to urge the main contact portions against the second terminal when the first and the second apparatus are connected. The main contact portions of at least two of the plurality of contact-finger-elements are shifted one relative to the other in such a manner so to engage the second terminal in subsequent moments when
(Continued)

the first apparatus is being connected to the second apparatus by a relative movement thereof along the connection/disconnection direction.

13 Claims, 7 Drawing Sheets

(51) Int. Cl.
    *H01H 33/02*     (2006.01)
    *H01R 13/11*     (2006.01)
    *H02B 11/04*     (2006.01)
    *H01R 13/18*     (2006.01)
    *H01R 13/187*     (2006.01)

(52) U.S. Cl.
    CPC ........... *H01R 13/111* (2013.01); *H01R 13/18* (2013.01); *H02B 11/04* (2013.01); *H01H 2001/5872* (2013.01); *H01R 13/187* (2013.01)

(58) Field of Classification Search
    USPC .................................................. 439/249–252
    See application file for complete search history.

(56) References Cited

FOREIGN PATENT DOCUMENTS

| | | |
|---|---|---|
| DE | 202015006807 U1 | 10/2015 |
| EP | 0967684 A2 | 12/1999 |
| EP | 2110826 A1 | 10/2009 |

OTHER PUBLICATIONS

European Patent Office, Extended Search Report issued in corresponding Application No. 16164714.4, dated Sep. 23, 2019, 8 pp.

* cited by examiner

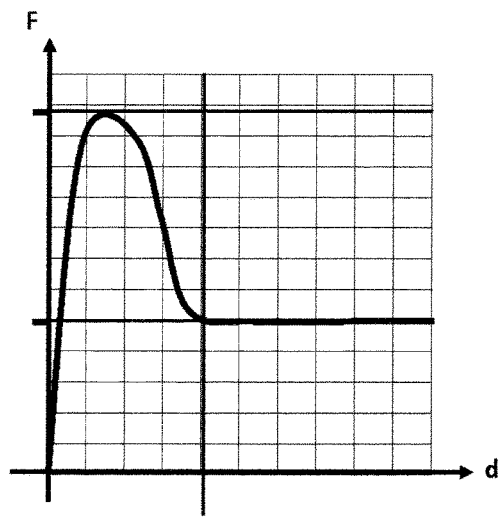
FIG. 1
(PRIOR ART)
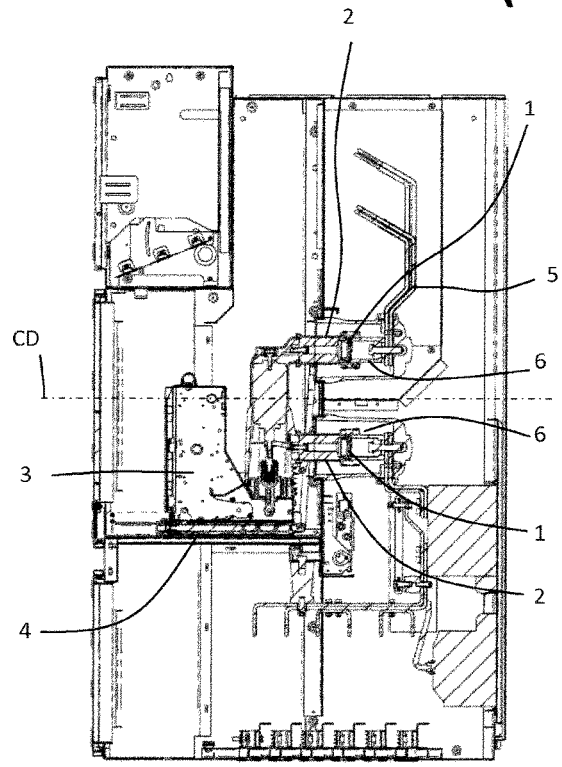
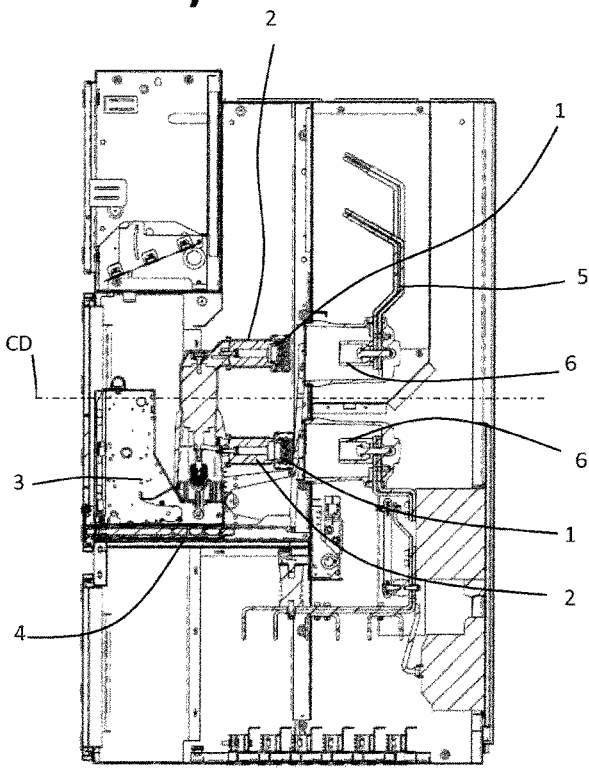
FIG. 2a  FIG. 2b

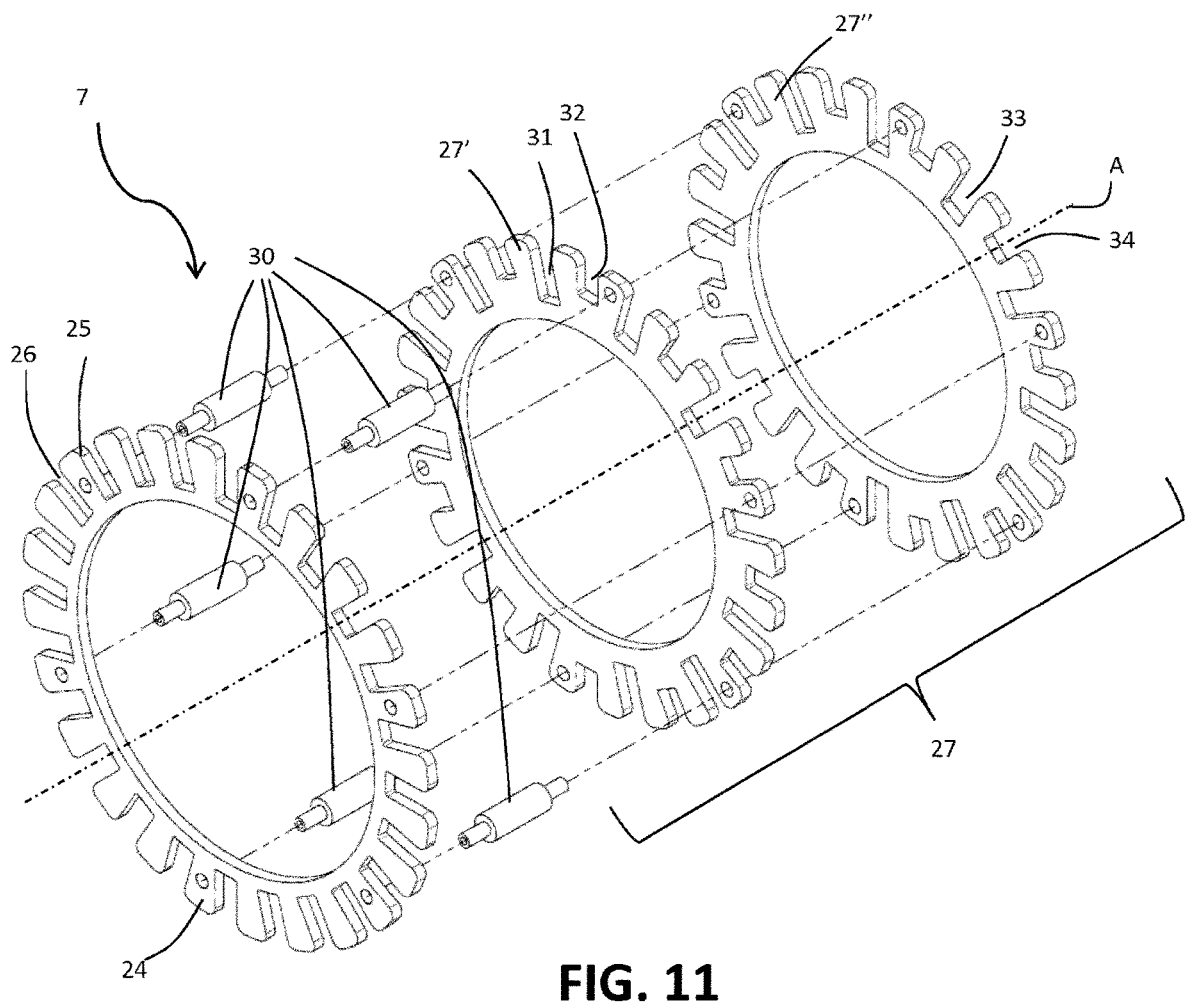
FIG. 11
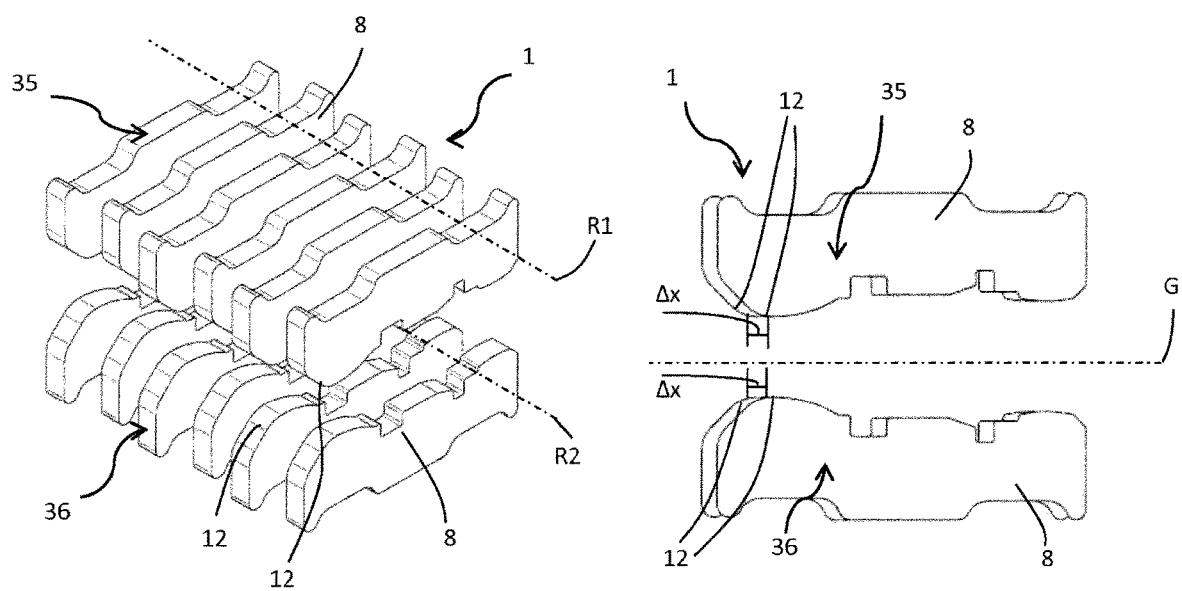
FIG. 12
FIG. 13

CONTACT ASSEMBLY FOR ELECTRICALLY AND MECHANICALLY CONNECTING A FIRST TERMINAL OF A FIRST APPARATUS TO A SECOND TERMINAL OF A SECOND APPARATUS

BACKGROUND

Technical Field

The present invention relates to a contact assembly for connecting electrically and mechanically a first terminal of a first apparatus to a second terminal of a second apparatus. In particular, by way of example, the present invention relates to a contact-assembly suitable for connecting a movable conducting terminal of a switching device, such as a circuit-breaker, to a stationary conducting terminal of a switchgear apparatus.

Description of the Related Art

In the medium voltage field (which commonly refers to voltages from 1 kV to some tens of kV), it is known the use of the so called tulip-contact-assemblies for the mechanical and electrical connection of a movable conducting terminal, provided on a draw-out circuit breaker, to a stationary conducting terminal of switchgear.

The tulip-contact-assembly comprises a support frame which is defined by a pair of annular plates which are mutually parallel and spaced apart and which are fixed to one other by rods. The tulip-contact-assembly further comprises a plurality of contact-finger-elements which rest into seat-portions of the flanges and are urged radially against the latter by helical springs extending with a ring-shape around a central axis of the support frame.

Each contact-finger-element has an oblong shape extending along a longitudinal axis parallel to the above mentioned central axis, and comprises a front contact portion for removably engaging with a stationary contact-pin of the switchgear, and a rear contact portion intended to keep in contact with a conducting-arm of the movable circuit breaker.

In general, it is necessary that, when the connection is established, the tulip-contact-assembly exerts a very high force on the pin of the switchgear. However this results in a very high racking-in force, i.e. the force which is necessary to couple the tulip-contact-assembly with the contact pin of the switchgear, due to the large number of contact-finger-elements that need to be opened and connected to the contact pin of the switchgear. FIG. 1 is a diagram showing the racking-in force F as a function of the tulip-contact-assembly position d relative to the pin of the switchgear. As shown, the force reaches a maximum in correspondence of the first engagement of the contact-finger-elements with the pin (mainly due to the elastic forces of the springs), then drops to a constant value during a sliding phase where friction is present.

This high racking-in force could cause an unreliable electrical connection between the circuit breaker and the switchgear.

Moreover, sometimes it happens that a properly connection doesn't occur. An unreliable connection might cause in turn high electrical resistance, over-temperature in the panel, low performances during a short time current.

BRIEF SUMMARY OF THE INVENTION

The problem underlying the present invention is therefore to provide a contact-assembly for mechanically and electrically connecting a first terminal of a first apparatus and a second terminal of a second apparatus, for example but not limited to a tulip-contact-assembly, for connecting a movable conducting terminal of a switching device, such as a circuit breaker, to a stationary conducting terminal of a switchgear apparatus, which is suitable to maintain a very high force when the two terminals are connected, while reducing the peak of the racking-in force during the racking-in phase.

This problem is solved by a contact assembly according to the claim 1.

Dependent claims define possible advantageous embodiments of the invention.

BRIEF DESCRIPTION OF THE DRAWINGS

Further characteristics and advantages will be more apparent from the following description of preferred embodiments and of their alternatives given as a way of an example with reference to the enclosed drawings in which:

FIG. 1 is a diagram showing the force F as a function of the position d during the coupling of a first terminal and a second terminal through a contact assembly according to the prior art;

FIGS. 2a and 2b are side partially sectional views of a circuit breaker and switchgear, respectively in a connected and in a disconnected configuration;

FIG. 11 is a perspective exploded view of the support frame of FIG. 10;

FIG. 12 is a partial perspective view of a gripper-contact-assembly according to a possible embodiment of the invention;

FIG. 13 is a partial side view of the gripper-contact-assembly in FIG. 12;

DETAILED DESCRIPTION

Figure 3A:
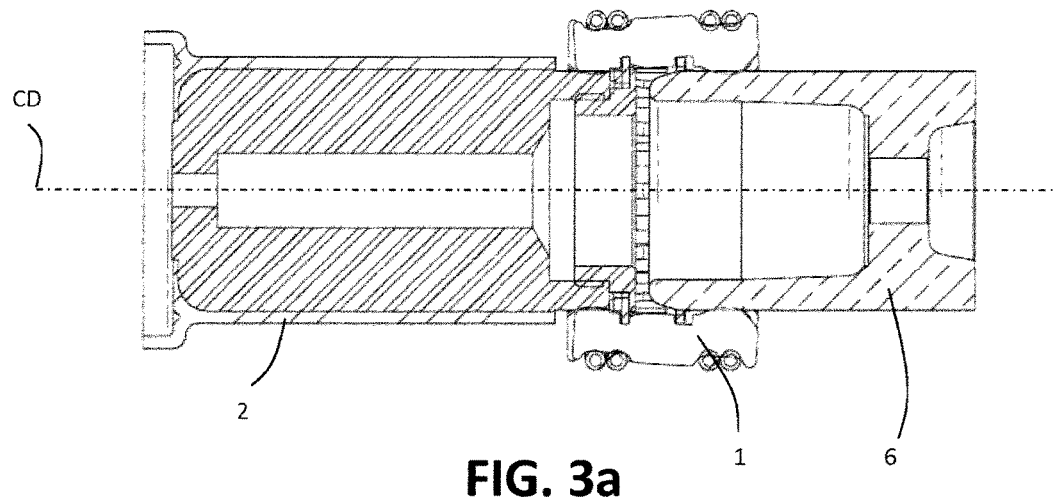
FIGS. 3a and 3b are enlarged views of a particular of FIGS. 2a and 2b, respectively.
Figure 3B:
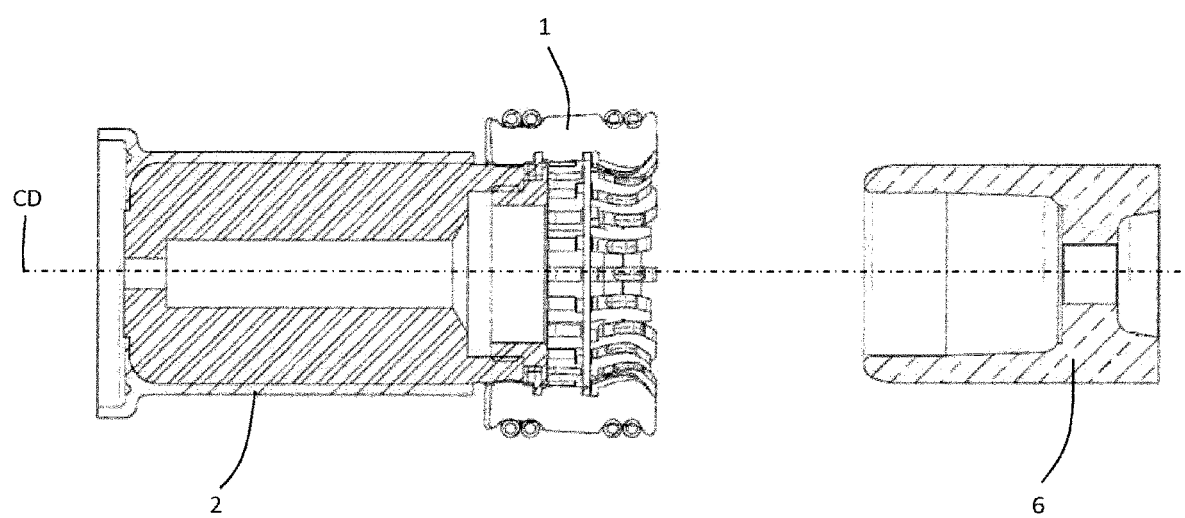

In the following description, same alphanumeric references are used for analogous exemplary elements when they are depicted in different drawings.

With reference to the attached Figures, a contact-assembly is indicated with reference 1. In the present description a contact-assembly of the tulip type will be mainly considered as an exemplary embodiment (FIGS. 2-11). However, as will be described later, further possible embodiments of the contact assembly are possible. For example, the contact-assembly 1 can be of the gripper type (FIGS. 12-15).

The contact assembly 1 according to the invention is intended in general for connecting electrically and mechanically a first terminal of a first apparatus to a second terminal of a second apparatus, wherein the first and the second apparatus, or at least portions thereof, are movable one with respect to the other. However, in the following exemplary and not limitative description, the contact assembly will be described for the connection of a circuit breaker and a switchgear apparatus.

Therefore, referring now to the exemplary embodiment of FIGS. 2a-2b, the contact-assembly 1 can be fixed to a conducting terminal 2 of a switching device 3, such as a circuit breaker, in particular a draw-out circuit breaker housed in a switchgear apparatus 5. Such a circuit breaker 3, in a non-limitative way, is preferably of the type which is supported by a motorized trolley 4 that can move from an extraction position with respect to the switchgear 5 (FIGS. 2b and 3b), in which the movable conducting terminal 2 (such as a contact-arm or a conducting-bushing), is disengaged from a stationary conducting terminal 6 (such as a stationary-conducting-pin), to an insertion position in the switchgear 5 (FIGS. 2a and 3a), in which the movable conducting terminal 2 is connected to the respective stationary conducting terminal 6. The contact-assembly 1 is fixed to the conducting terminal 2 mounted on and movable together with the circuit breaker 3 and engages with the stationary conducting terminal 6 of the switchgear 5. However, in an alternative further possible embodiment (not shown in the Figures), the tulip-contact-assembly 1 can also be assembled on the stationary conducting terminal 6 of the switchgear 5 in order to receive, and engage with, the movable conducting terminal 2 of the circuit breaker 3.

Figure 4:
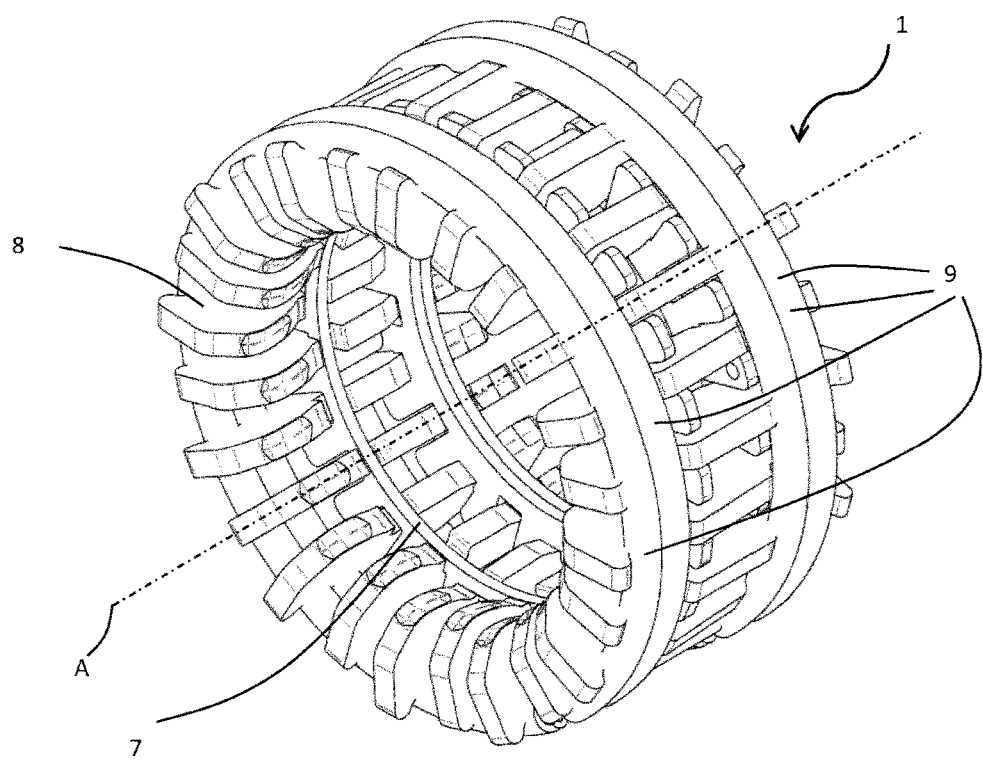
FIG. 4 is a perspective view of a tulip-contact-assembly according to a possible embodiment of the invention.
Figure 5:
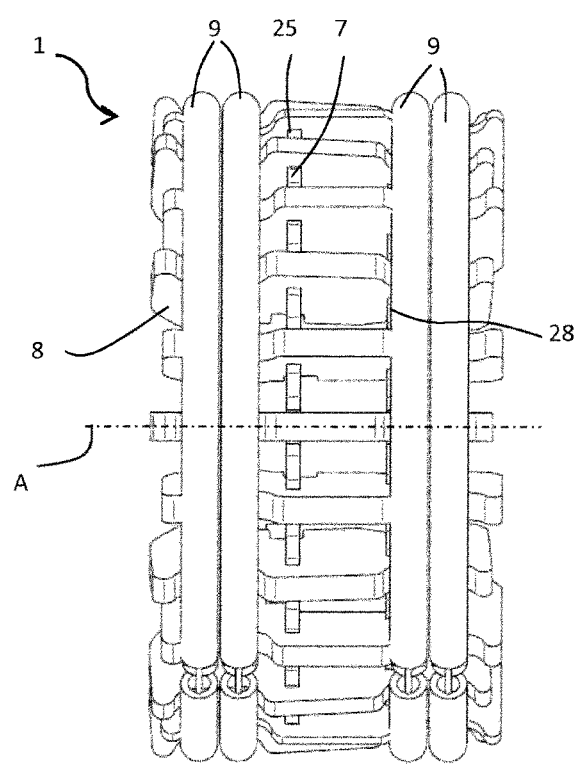
FIG. 5 is a side view of the tulip-contact-assembly of FIG. 4.
Figure 6:
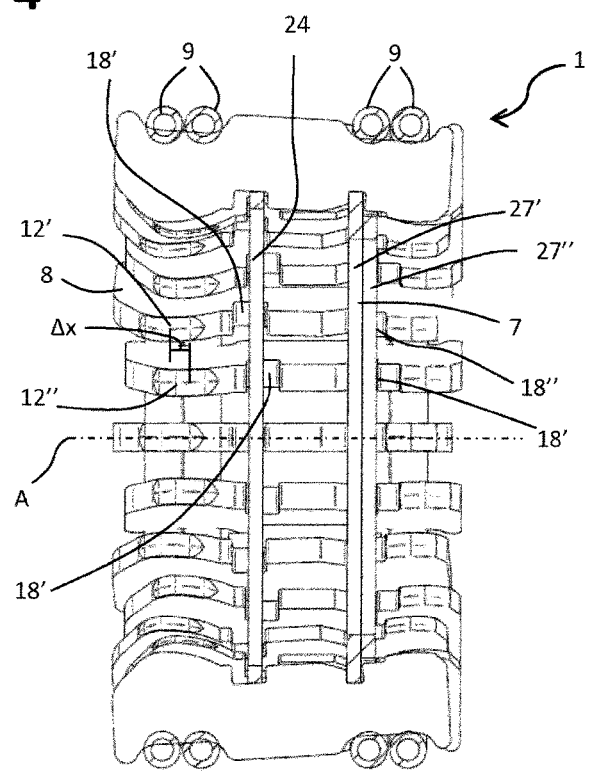
FIG. 6 is a sectional view of the tulip-contact-assembly of FIG. 4.

FIGS. 4-6 show a tulip-contact assembly 1 according to a possible embodiment of the invention. According to the embodiment shown, the tulip-contact-assembly 1 comprises a support frame 7 for supporting and holding in a correct position a plurality of contact-finger-elements 8 which will be described in detail later on. The support frame 7 develops circumferentially around a frame central axis A. The contact-finger-elements 8 are arranged side by side, preferably according to a uniform angular distribution, circumferentially around the central axis A on the support frame 7. It is however to be noted that, according to a further possible embodiment not shown in the figures, the support frame 7 can be missing. In this case, contact-finger-elements are supported directly by the first terminal to which the contact assembly 1 is connected.

Referring back to FIGS. 4-6, the tulip-contact-assembly 1 further comprises one or more spring elements 9, preferably of helical shape, for urging the contact-finger-elements 8 radially towards the central axis A, i.e. in a contact position against the stationary conducting-terminal 4 and against the movable conducting-terminal 2 when the circuit breaker 3 and the switchgear 5 are connected through the contact assembly 1. In the embodiment shown, two pairs of spring elements 9 are shown.

Figure 7:
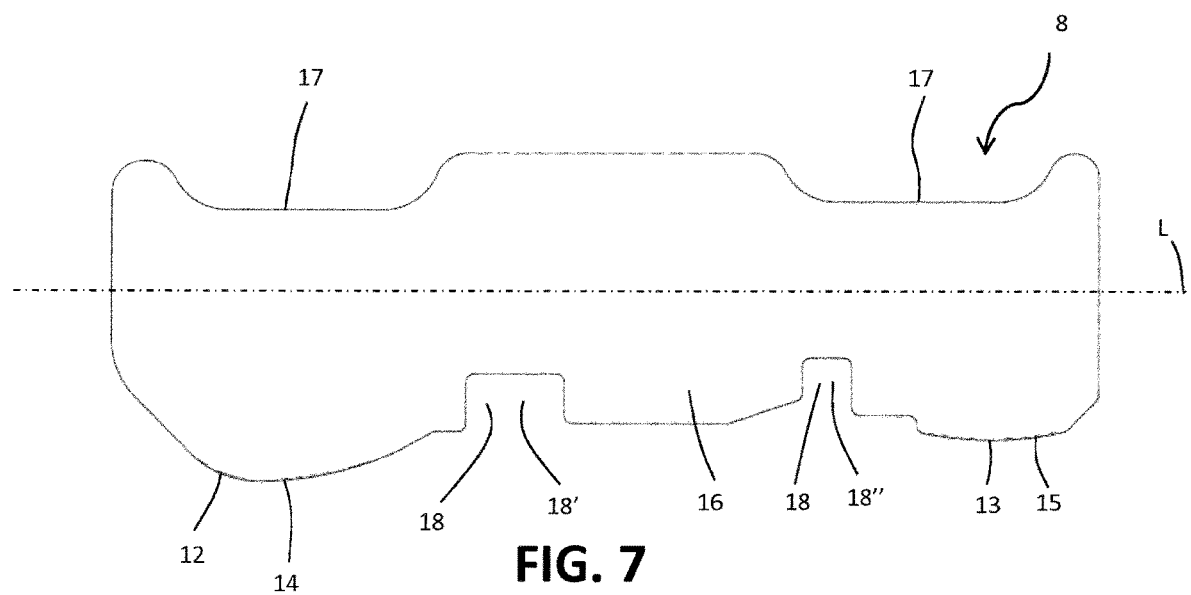
FIG. 7 is a side view of a contact-finger-element of the contact assembly according to a possible embodiment of the invention.
Figure 8:
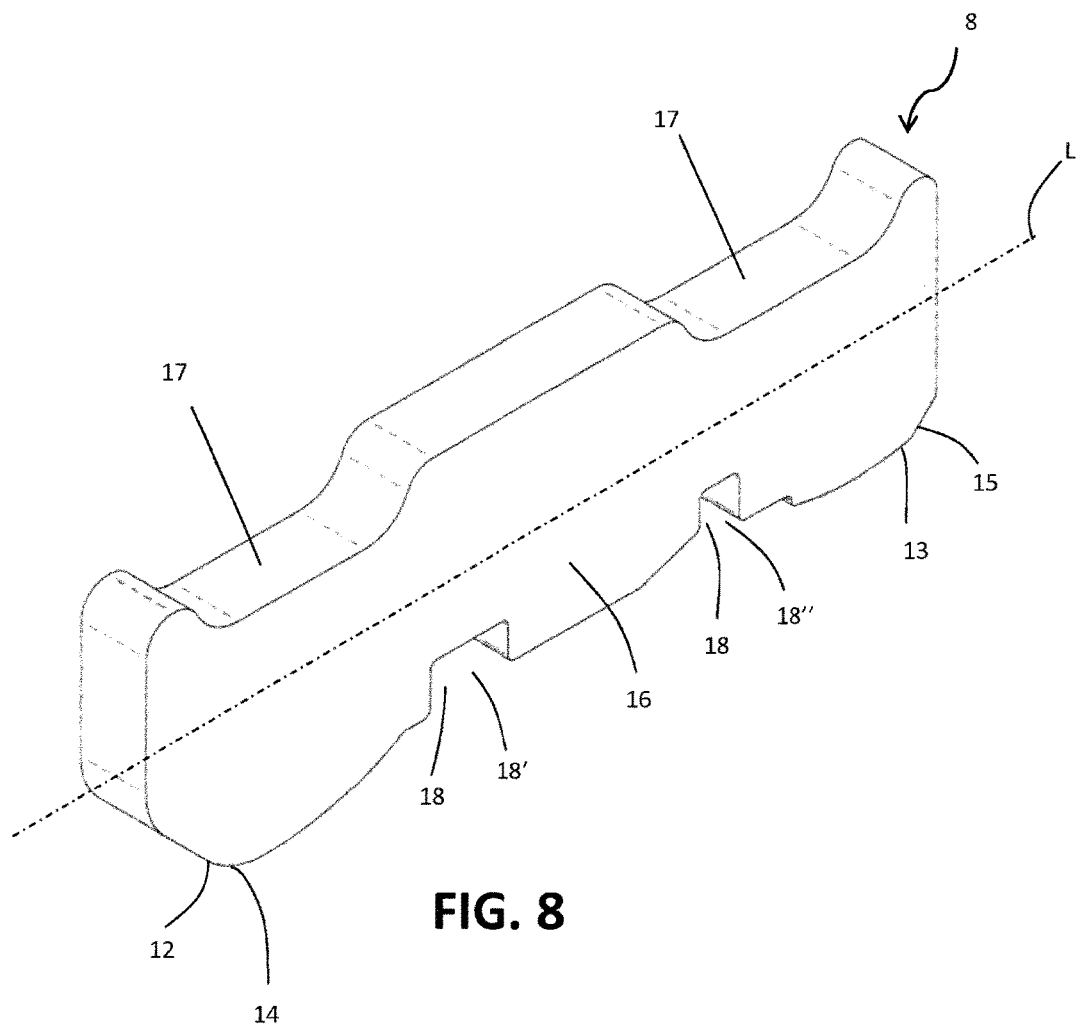
FIG. 8 is a perspective view of the contact-finger-element of FIG. 7.

In FIGS. 7-8 a contact-finger element 8 according to a possible embodiment is shown. The contact-finger-element 8 comprises a body extending along a longitudinal axis L, at opposite ends of which there are provided a main contact-portion 12, which is configured for engaging with an external surface of the stationary conducting terminal 6, and an auxiliary contact-portion 13, which is configured for engaging with an external surface of the movable conducting terminal 2. The main contact portion 12 comprises a preferably a convex main contact surface 14 and the auxiliary contact portion 13 comprises a preferably a convex auxiliary contact surface 15. A mutual joining zone 16 between the two first contact surfaces 14 and 15 is provided. The main contact portion 12 is preferably in a front position, whilst the auxiliary contact portion 13 is preferably in a rear position, i.e. respectively in a distal position and in a proximal position with reference to the movable conducting terminal 2 to which the contact-assembly 1 is coupled in working conditions.

On each contact-finger-element 8 there are obtained one or more spring seats 17 for receiving portions of the spring elements 9. In the shown embodiment, there are provided two spring seats 17 each for receiving a pair of spring elements 9 as shown in FIGS. 4-6. Moreover, each contact-finger-element 8 comprises one or more resting seats 18 through which the contact-finger-element 8 is received on the support frame 7. Further details of the resting seats 18 will be given below. The resting seats 18 are opposite to the spring seats 17 with respect to the longitudinal axis L. The finger-contact elements 8 are electrically conductive.

Advantageously, in the contact-assembly 1 the main contact portions 12 of at least two of the contact-finger-elements 8 are shifted one relative to the other. In this manner, with reference for example to FIGS. 1a-1b and 2a 2b, when circuit breaker 3 approaches the switchgear 5 along a connection/disconnection direction CD in order to realize the connection between the movable conducting terminal 2 and the stationary conducting terminal 6 through the contact assembly 1 fixed to the movable conducting terminal 2, the at least two shifted main contact portions 12 engage the stationary conducting terminal 6 in different, subsequent moments. Consequently, the racking-in force is also partitioned and its highest value is lower that the racking-in force necessary to spread all the contact-finger elements simultaneously, as discussed with reference with FIG. 1.

In order to better understand this aspect of the invention, reference is made again to the exemplary embodiment of the tulip-contact assembly 1 as shown in FIGS. 4-6. In the exemplary embodiment shown, the main contact portions 12 of all the contact-finger-elements 8 are shifted one relative to the other in an alternating manner. The relative shifting of two main contact portions 12' and 12" is indicated with Δx and is referred to the frame central axis A, which, under working condition, is substantially parallel to the above mentioned connection/disconnection direction CD. According to the embodiment shown, the contact-finger-elements 8 comprises two groups, wherein the contact-finger-elements of each group have non-shifted main contact portions which are shifted relative to the main contact portions of the other group, wherein the contact-finger-elements of the first group alternate with the contact-finger-elements of the second group. However, as will be understood by the skilled person, different arrangements and different kinds of shifting can be envisaged. For example, the contact-finger-elements of the two groups may be not alternating but grouped in distinct shifted group. Furthermore, it is possible to have several groups of contact-finger-elements, wherein the are several shifting Δx1, Δx2, . . . of the respective main contact portions.

With reference again to the embodiment shown in FIGS. 4-6, in particular to FIG. 6, it is clear that, during the racking-in phase, the main contact portions 12' enters in contact with the stationary conducting terminal 6 prior than the main contact portions 12", which is shifted of a Δx quantity with respect to the main contact portions 12'. When the main contact portions 12" enter in contact with the stationary conducting terminal 6, the main contact portions 12' are already in the engaged position with and are sliding on the conducting terminal 6.

Figure 9:
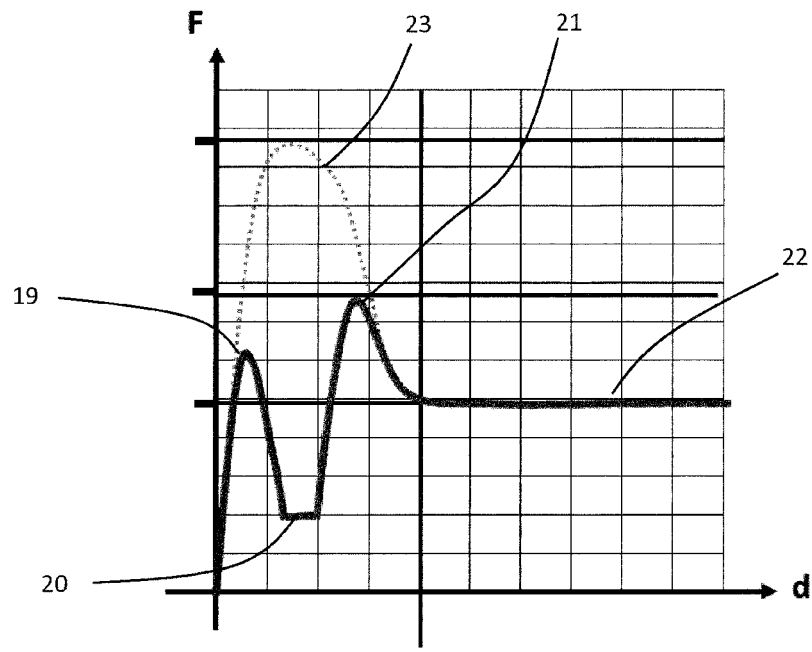
FIG. 9 is a diagram showing the force F as a function of the position d during the coupling of a first terminal and a second terminal through a contact assembly according to the invention.

The resulting force F, as a function of the position d, necessary for realizing the connection is shown in FIG. 9. As shown, there is a first force peak 19 when the main contact portions 12' enter in contact with the stationary conducting terminal 6. Then the force drops to a first substantially constant value 20 due to the sliding of the main contact portions 12'. Then, the force reaches a second force peak 21 when the main contact portions 12" enter in contact with the stationary conducting terminal 6 (in this moment, the main contact portions 12' continue to slide). Then, again, the force drops to a second substantially constant value 22 due to the sliding of both the main contact portions 12' and 12" on the stationary conducting terminal 6. As can be seen from FIG. 9, compared to the case according to the prior art where the shifting Δx between the main contact portions is equal to zero (dotted line 23), the maximum force is significantly lower during the racking-in phase and is the same when the contact-assembly 1 has completed the engagement of the stationary conducting terminal 6. From the above it is clear that the total racking-in force F is substantially given by the sum of a force $F_s$ due to the spring elements and of a force $F_F$ due to the friction. Of course, this force F is influenced by the number of contact finger elements which enter in contact with the second terminal in a given moment, by the geometry of the second terminal which affects the elastic deformation of the spring elements and consequently the overall spring force, and by the geometry of the fingers, which affects the racking-in force during the first contact with the second terminal and during the sliding. The larger is the number of contact-linger elements involved in a given moment and in a given position, the higher is the racking-in force. Consequently, the larger is the number of shifts of the main contact portions, the lower is the overall racking-in force.

The shifting of the main contact portions 12 in the tulip-contact assembly 1 can be obtained in different ways.

In accordance with the embodiment shown in FIGS. 4-6, all the contact-finger-elements 8 have same shapes and same dimensions and are disposed shifted one relative to the other on the support frame 7. In this manner, their main contact portions 12 are shifted one relative to the other due to the positions of the contact-finger-elements 8 on the support frame 7.

Figure 10:
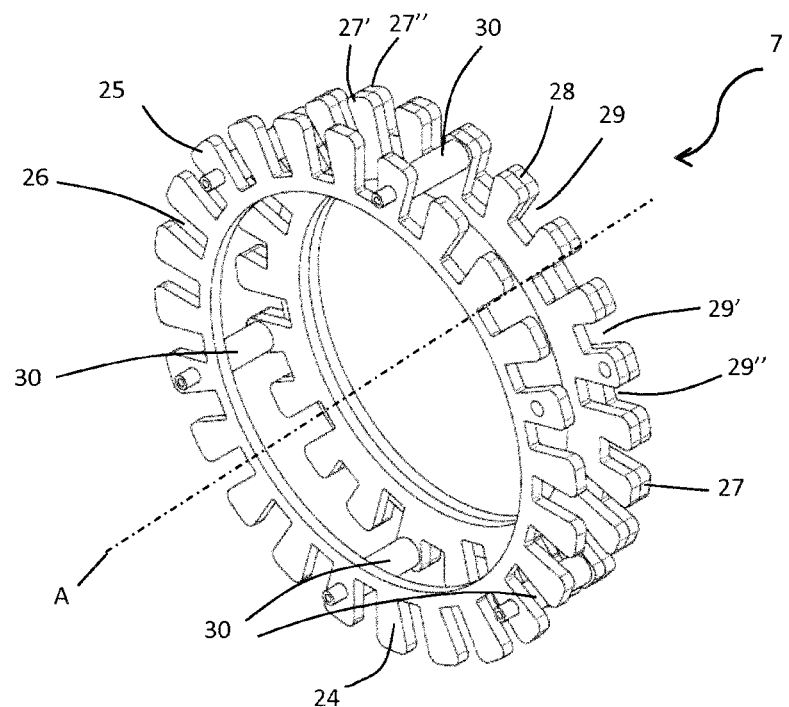
FIG. 10 is a perspective view of a support frame of a tulip-contact-assembly according to a possible embodiment of the invention.

In order to obtain the relative shifting of the same-shaped contact-finger-elements 8, the support frame 7 can be configured for example as shown in FIGS. 10-11. According to the shown embodiment, the support frame 7 comprises a first plate 24 developing circumferentially around the central axis A and forming first radial protrusions 25 alternating with first radial slots 26, and a second plate 27 developing circumferentially around the central axis A and forming second radial protrusions 28 alternating with second radial slots 29. A plurality of rods 30 extending parallel to the central axis A connect the first plate 24 and the second plate 27. The second slots 29 in turn comprise primary second slots 29' and secondary second slots 29" alternating with the primary second slots 29', wherein the primary second slots 29' are shifted relative to the secondary second slots 29" along the central axis A and are radially positioned in the same position as the secondary second slots 29". As it is shown in FIGS. 7-8, a contact-finger-element 8 first resting seat 18' is elongated with respect to a second resting seat 18", which in turn is configured and dimensioned to match both the primary second slots 29' and the secondary second slots 29" dimensions. In this manner, the second resting seat 18" can engage both the primary second slots 29' and the secondary second slots 29" of the second plate 27 and the corresponding contact-finger-element 8 is locked axially on the support frame 7 by this engagement. The first resting seat 18' is on the contrary engaged by the first slots 26 of the first plate 24 in different positions depending on which of the primary second slot 29' and the secondary second slot 29" engages the second resting seat 18". What above described can be more clearly seen in FIGS. 5 and 6.

In order to obtain the above described arrangement of the primary second slots 29' and of the secondary second slots 29", the second plate 27 can be embodied for example as shown in FIG. 11. In accordance with this exemplary embodiment, the second plate 27 comprises a first auxiliary plate 27' having radially lower slots 31 alternating with radially higher slots 32, and a second auxiliary plate 27" having radially lower slots 33 alternating with radially higher slots 34. The first 27' and the second 27" auxiliary plates are bonded together such that the radially lower slots 31 of the first auxiliary plate 27' correspond to the radially higher slots 34 of the second auxiliary plate 27", and the radially higher slots 32 of the first auxiliary plate 27' correspond to the radially lower slots 33 of the second auxiliary plate 27". In this manner, the above mentioned axial shifting of the primary second slots 29' and of the secondary second slots 29" is obtained.

In accordance with a further possible embodiment, not shown in the Figures, the second radial slots 29 are radially and axially in the same position, i.e. they are not axially shifted, and the shifting of the contact-finger-elements 8 main contact portions 12 is obtained by differently shaping the contact-finger-elements 8, for example by making them with the main contact portions 12 shifted.

In the embodiments described above, the contact-assembly 1 is tulip-shaped. However, as already anticipated above, the contact assembly 1 can be differently shaped. In particular, it can be gripper-shaped. FIGS. 12-13 and 14-15 schematically show two possible alternative embodiments of a gripper-contact-assembly 1. The gripper-contact assembly can be used for example for the connection of the gripper to a conducting bus bar instead of a cylindrical terminal.

The gripper-contact-assembly 1 comprises a first group 35 and a second group 36 of contact-finger-elements 8 opposite to the first group 35 of contact-finger-elements 8. In each of the first 35 and the second 36 group, the contact-linger-elements are placed side by side parallel one to another oriented according to a gripping axis G (which is substantially parallel to the above mentioned connection/disconnection direction CD under working conditions), in such a manner that the main contact portions 12 of the contact-finger-elements 8 of the first group 35 face the main contact portions 12 of the contact-finger-elements 8 of the second group 36.

The contact-finger-elements 8 of both the first 35 and the second 36 groups are connected, preferably in a rotatable manner around rotation axes R1 and R2, to a support frame not shown. Preferably, rotation axes R1 and R2 lie in a plane (not shown) to which the gripping axis G is perpendicular. Spring elements (not shown) act on the contact-finger-elements 8 of both the first 35 and the second 36 groups such that they are urged ones towards the others in order to perform the gripping function.

In accordance with the embodiment shown in FIGS. 12-13, in each of the first 35 and the second 36 groups of contact-finger-elements 8, all the main contact portions 12 are alternatively shifted of a quantity Δx one to the other with respect to the support gripping axis G.

Figure 14:
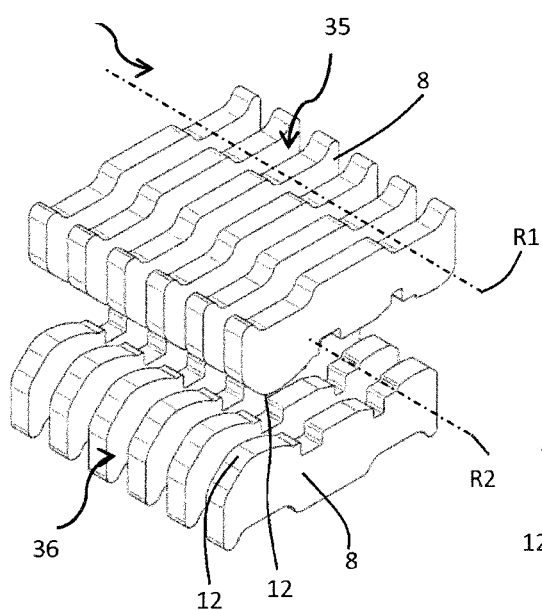
FIG. 14 is a partial perspective view of a gripper-contact-assembly according to a further possible embodiment of the invention.
Figure 15:
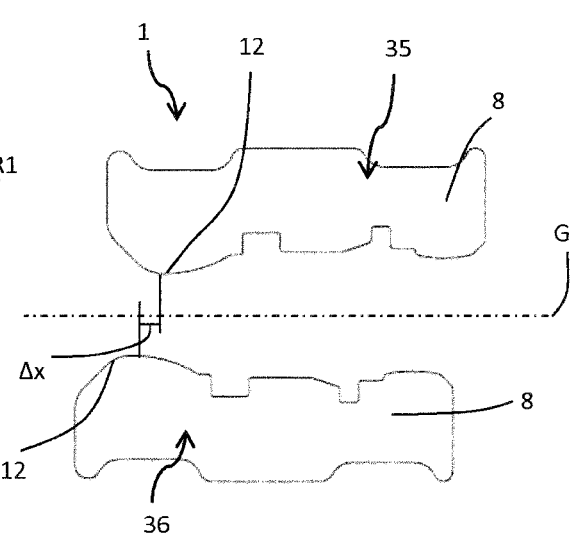
FIG. 15 is a partial side view of the gripper-contact-assembly in FIG. 14.

In accordance with the embodiment shown in FIGS. 14-15, in each of the first 35 and the second 36 groups of contact-finger-elements 8, the main contact portions 12 are aligned, but the main contact portions 12 of the contact-finger-elements 8 of the first group 35 are shifted of a quantity Δx along the gripping axis G relative to the contact-finger-elements 8 of the second group 36.

In both cases, as discussed for the tulip-contact-assembly, the peak force during the racking-in phase is reduced with respect to a gripper-conduct-assembly according to the prior art, where no shifting is provided among the main connecting portions.

Of course, as already discussed for the tulip-contact-assembly, also in the gripper-contact-assembly it is possible to obtain more complex shifting schemes by differently positioning the main contact portions 12.

Moreover, also in the gripper-contact-assembly the shifting can be obtained either by differently positioning on the support frame same shaped and dimensioned contact-finger-elements, or, alternatively, by differently shaping the contact-finger-elements.

To the above-mentioned embodiments of the contact-assembly according to the invention, the skilled person, in order to meet specific current needs, can make several additions, modifications, or substitutions of elements with other operatively equivalent elements, without however departing from the scope of the appended claims.

The invention claimed is:

1. A contact assembly for connecting electrically and mechanically a first terminal of a first apparatus to a second terminal of a second apparatus, wherein at least one of the first and the second apparatus is movable with respect to the other along a connection/disconnection direction, comprising:
   a plurality of electrically conducting contact-finger-elements, each comprising a main contact portion configured for engaging said second terminal and an auxiliary contact portion for engaging said first terminal, wherein said finger-contact-elements are supported by a support frame of the contact assembly connectable to said first terminal or are configured for being directly connectable and supportable by said first terminal; and
   one or more spring elements configured for acting on said contact-finger-elements so to urge said main contact portions against said second terminal when the first and the second apparatus are connected,
   wherein the main contact portions of at least two of said plurality of contact-finger-elements are shifted one relative to the other in such a manner so to engage the second terminal in subsequent moments when the first apparatus is being connected to the second apparatus by a relative movement thereof along said connection/disconnection direction,
   wherein said support frame comprises a first plate developing circumferentially around a central axis and forming first radial protrusions alternating with first radial slots, a second plate developing circumferentially around said central axis and forming second radial protrusions alternating with second radial slots, and a plurality of rods connecting said first plate and second plate, said at least two contact-finger-elements comprising a first resting seat to be engaged by one of the first radial slots and a second resting seat to be engaged by one of the second radial slots, and
   wherein said second radial slots comprise primary second slots and secondary second slots alternating with the primary second slots, wherein said primary second slots are shifted relative to the secondary second slots along the central axis, wherein the at least two contact-finger-elements first resting seat is elongated with respect to the second resting seat, and the second resting seat is configured and dimensioned to match both the primary second slots and the secondary second slots dimensions, such that the second resting seat can be engaged by both the primary second slots and the secondary second slots, and the first resting seat can be engaged by the first radial slots in different positions depending on which of the primary second slot and the secondary second slot engages the second resting seat.

2. The contact assembly according to claim 1, wherein said at least two contact-finger-elements of said plurality of contact-finger-elements are differently shaped and arranged such that their main contact portions are shifted one relative to the other due to their shapes.

3. The contact assembly according to claim 1, wherein said contact-finger-elements of said plurality of contact-finger-elements have same shapes and same dimensions and are disposed shifted one relative to the other.

4. The contact assembly according to claim 1, wherein said contact assembly is a tulip-contact-assembly, wherein said plurality of contact-finger-elements are arranged side by side circumferentially around a central axis, wherein the main contact portions of said at least two of said plurality of contact-finger-elements are shifted one relative to the other with respect to said central axis.

5. The contact assembly according to claim 1, wherein said second plate comprises a first auxiliary plate having radially lower slots alternating with radially higher slots, and a second auxiliary plate having radially lower slots alternating with radially higher slots, wherein the first and the second auxiliary plates are bonded together such that the radially lower slots of the first auxiliary plate correspond to the radially higher slots of the second auxiliary plate, and the radially higher slots of the first auxiliary plate correspond to the radially lower slots of the second auxiliary plate.

6. The contact assembly according to claim 4, wherein the main contact portions of all the contact-finger-elements are shifted one relative to the other in an alternating manner.

7. The contact assembly according to claim 1, wherein said contact assembly is a gripper-contact assembly and comprises a first group of said contact-finger-elements and a second group of said contact-finger-elements, wherein in each of the first and the second group the contact-finger-elements are placed side by side parallel oriented according to a gripping axis, and wherein the first group of finger contact elements is arranged opposite to the second group of contact elements, such that the main contact portions of the contact-finger-elements of the first group face the main contact portions of the contact-finger-elements of the second group.

8. The contact assembly according to claim 7, wherein in each of the first and the second group of contact-finger-elements, all the main contact portions are alternatively shifted one to the other along said support gripping axis.

9. The contact assembly according to claim 7, wherein in each of the first and the second group of contact-finger-elements the main contact portions are aligned, the main contact portions of the contact-finger-elements of the first group being shifted along said gripping axis relative to contact-finger-elements of the second group.

10. The contact assembly according to claim 2, wherein said contact assembly is a tulip-contact-assembly, wherein said plurality of contact-finger-elements are arranged side by side circumferentially around a central axis, wherein the main contact portions of said at least two of said plurality of contact-finger-elements are shifted one relative to the other with respect to said central axis.

11. The contact assembly according to claim 3, wherein said contact assembly is a tulip-contact-assembly, wherein said plurality of contact-finger-elements are arranged side by side circumferentially around a central axis, wherein the main contact portions of said at least two of said plurality of contact-finger-elements are shifted one relative to the other with respect to said central axis.

12. A system comprising:
a circuit breaker;
wherein said circuit breaker includes:
a contact assembly for connecting electrically and mechanically a first terminal of a first apparatus to a second terminal of a second apparatus, wherein at least one of the first and the second apparatus is movable with respect to the other along a connection/disconnection direction comprising:
a plurality of electrically conducting contact-finger-elements, each comprising a main contact portion configured for engaging said second terminal and an auxiliary contact portion for engaging said first terminal, wherein said finger-contact-elements are supported by a support frame of the contact assembly connectable to said first terminal or are configured for being directly connectable and supportable by said first terminal; and
one or more spring elements configured for acting on said contact-finger-elements so to urge said main contact portions against said second terminal when the first and the second apparatus are connected,
wherein the main contact portions of at least two of said plurality of contact-finger-elements are shifted one relative to the other in such a manner so to engage the second terminal in subsequent moments when the first apparatus is being connected to the second apparatus by a relative movement thereof along said connection/disconnection direction,
wherein said support frame comprises a first plate developing circumferentially around a central axis and forming first radial protrusions alternating with first radial slots, a second plate developing circumferentially around said central axis and forming second radial protrusions alternating with second radial slots, and a plurality of rods connecting said first plate and second plate, said at least two contact-finger-elements comprising a first resting seat to be engaged by one of the first radial slots and a second resting seat to be engaged by one of the second radial slots, and
wherein said second radial slots comprise primary second slots and secondary second slots alternating with the primary second slots, wherein said primary second slots are shifted relative to the secondary second slots along the central axis, wherein the at least two contact-finger-elements first resting seat is elongated with respect to the second resting seat, and the second resting seat is configured and dimensioned to match both the primary second slots and the secondary second slots dimensions, such that the second resting seat can be engaged by both the primary second slots and the secondary second slots, and the first resting seat can be engaged by the first radial slots in different positions depending on which of the primary second slot and the secondary second slot engages the second resting seat.

13. An apparatus comprising a system according to claim 12 having at least one movable conducting terminal, and a switchgear having at least one stationary conducting terminal, wherein said contact assembly is coupled either to the movable conducting terminal or to the stationary conducting terminal so to allow the mechanical and electrical connection of the circuit breaker and the switchgear.

* * * * *